United States Patent
Gray et al.

(10) Patent No.: US 6,816,923 B1
(45) Date of Patent: Nov. 9, 2004

(54) ARBITRATING AND SERVICING POLYCHRONOUS DATA REQUESTS IN DIRECT MEMORY ACCESS

(75) Inventors: Donald M. Gray, San Francisco, CA (US); Agha Zaigham Ahsan, Palo Alto, CA (US)

(73) Assignee: Webtv Networks, Inc., Mountain View, CA (US)

(*) Notice: Subject to any disclaimer, the term of this patent is extended or adjusted under 35 U.S.C. 154(b) by 597 days.

(21) Appl. No.: 09/628,473

(22) Filed: Jul. 31, 2000

(51) Int. Cl.[7] .............................................. G06F 13/28
(52) U.S. Cl. ............................ 710/25; 710/22; 710/39; 710/40; 710/52
(58) Field of Search ........................ 710/22–28, 39–45, 710/52, 107, 111, 112–117, 308, 36, 309; 709/250; 370/412

(56) References Cited

U.S. PATENT DOCUMENTS

| | | | | | |
|---|---|---|---|---|---|
| 5,388,237 A | * | 2/1995 | Sodos | ........................... | 710/22 |
| 5,826,101 A | * | 10/1998 | Beck et al. | ..................... | 712/34 |
| 5,828,856 A | * | 10/1998 | Bowes et al. | ................ | 710/308 |
| 5,941,967 A | * | 8/1999 | Zulian | ......................... | 710/107 |
| 5,991,817 A | * | 11/1999 | Rowett et al. | .............. | 709/250 |
| 6,098,110 A | * | 8/2000 | Witkowski et al. | .......... | 709/249 |
| 6,167,465 A | * | 12/2000 | Parvin et al. | ................... | 710/22 |
| 6,205,524 B1 | * | 3/2001 | Ng | .............................. | 711/151 |
| 6,226,338 B1 | * | 5/2001 | Earnest | ........................ | 375/372 |
| 6,505,265 B1 | * | 1/2003 | Ishikawa et al. | ............ | 710/113 |

* cited by examiner

*Primary Examiner*—Ilwoo Park
(74) *Attorney, Agent, or Firm*—Workman Nydegger (57) ABSTRACT

Systems and methods for servicing the data and memory requirements of system devices. A DMA engine that includes a data reservoir for reducing or eliminating device buffers is provided that manages and arbitrates the data requests from the system devices. An arbitration unit is provided that only allows eligible devices to make a data request in any given cycle to ensure that all devices will be serviced within a programmable time period. The data reservoir contains the data buffers for each channel of each device. A memory interface ensures that sufficient data for each channel is present in the data reservoir by making requests to a system's memory based on an analysis of each channel. Analysis factors include how much data is remaining in the data reservoir, how long will that data last, and how long until the channel will be analyzed again. Based on this analysis, a request is either made to the system's main memory, or the channel waits until it is evaluated again in the future. Each channel is thereby guaranteed a response time.

33 Claims, 4 Drawing Sheets

ARBITRATING AND SERVICING POLYCHRONOUS DATA REQUESTS IN DIRECT MEMORY ACCESS

BACKGROUND OF THE INVENTION

1. The Field of the Invention

The present invention relates to systems and methods for transferring data to and from memory in a computer system. More particularly, the present invention relates to systems and methods for servicing the data and memory requirements of system devices by arbitrating the data requests of those devices.

2. The Prior State of the Art

An important operational aspect of a computer or of a computer system is the need to transfer data to and from the memory of the computer. However, if the computer's processor is used to perform the task of transferring data to and from the computer's memory, then the processor is unable to perform other functions. When a computer is supporting high speed devices that have significant memory needs, the processor bears a heavy load if the processor is required to copy data word by word to and from the computer's memory system for those devices. As a result, using the processor to transfer data in this manner can consume precious processing time.

A solution to this problem is Direct Memory Access (DMA). A DMA controller essentially relieves the processor of having to transfer data to and from memory by permitting a device to transfer data to or from the computer's memory without the use of the computer's processor. A significant advantage of DMA is that large amounts of data may be transferred before generating an interrupt to the computer to signal that the task is completed. Because the DMA controller is transferring data, the processor is therefore free to perform other tasks.

As computer systems become more sophisticated, however, it is becoming increasingly evident that there is a fundamental problem between the devices that take advantage of DMA and the memory systems of those computers. More specifically, the problem faced by current DMA modules is the ability to adequately service the growing number of high speed devices as well as their varying data requirements.

High performance memory systems preferably provide high bandwidth and prefer large data requests. This is in direct contrast to many devices, which may request small amounts of data, have low bandwidth, and require small latencies. This results in system inefficiencies as traditional devices individually communicate with the memory system in an effort to bridge this gap. It is possible that many different devices may be simultaneously making small data requests to a memory system that prefers to handle large memory requests. As a result, the performance of the memory system is decreased.

This situation makes it difficult for low bandwidth devices, which may have high priority, to effectively interact with high bandwidth devices that may have lower priority. For example, an audio device may support several different channels that receive data from memory. The audio device typically makes a data request to memory for data every few microseconds for those channels. Because devices such as audio devices recognize that they may experience significant latency from the memory system before their request is serviced, the audio device may implement an excessively large buffer to account for that latency.

This is not an optimum solution for several reasons. For instance, many devices maintain a large buffer because they do not have a guarantee that their data requests will be serviced within a particular time period. Other devices maintain an excessively large buffer because it is crucial that the data be delivered in a timely manner even though the devices may have low bandwidth requirements. For example, if an audio device does not receive its data in a timely manner, the result is instantly noticed by a user. Additionally, each device must implement DMA control logic, which can be quite complex for some devices. In other words, the DMA control logic is effectively repeated for each device.

Current devices often interact with DMA systems independently of the other system devices and each device in the system is able to make a data request to the DMA at any time. As a result, it is difficult to determine which devices need to be serviced first. The arbitration performed by systems employing isochronous arbitration often defines fixed windows in which all devices that may require servicing are given a portion. These fixed windows are large from the perspective of high bandwidth devices and small from the perspective of low bandwidth devices. Thus, high bandwidth devices are required to buffer more data than they really need and low bandwidth devices often do not need to use their allocated portion of the window. This results in inefficiencies because all of the available bandwidth may not be used and additional memory is required for the buffers of high bandwidth devices. In essence, current systems do not adequately allow high priority devices to efficiently coexist with high bandwidth devices.

SUMMARY OF THE INVENTION

The present invention provides a DMA engine that manages the data requirements and requests of system devices. The DMA engine includes a data reservoir that effectively consolidates the separate memory buffers of the devices. In addition to consolidating memory, the DMA engine provides centralized addressing as well. The data reservoir is divided into smaller portions that correspond to each device. The DMA engine also provides a scalable bandwidth and latency to the system devices. An overall feature of the present invention is the ability to guarantee that a particular device will be serviced in a programmable response time. This guarantee enables the buffer sizes to be reduced, which conserves memory, as well as permits the available bandwidth to be efficiently utilized.

Because the DMA engine maintains the data reservoir, the DMA engine is responsible for providing each device with the data that the device requests. At the same time, the DMA engine is also responsible for monitoring the remaining data in the data reservoir such that a data request can be made to the system's memory when more data is required for a particular portion of the data reservoir. To accomplish these tasks, the DMA engine provides arbitration functionality to the devices as well as to the memory.

The arbitration functionality provided to the devices determines which devices are eligible to make a data request in a particular cycle. Each device may have multiple data channels, but the device is treated as a unit from the perspective of the DMA engine. By only allowing some of the devices to be eligible during a particular cycle, all devices are ensured of being serviced within a particular time period and high bandwidth devices are not permitted to consume more bandwidth than they were allocated.

The arbitration functionality provided between the DMA engine and the memory occurs on a per channel basis rather than a per device basis. Each channel is evaluated in turn to determine whether a data request should be made to memory or whether the channel can wait until it is evaluated again in the future. Because the number of channels is known and because the time needed to service a particular channel is known, each channel is assured of being serviced within a particular time period. This guarantee ensures that the data reservoir will have the data required by the system devices.

The arbitration interface between the system memory and the DMA engine addresses the data needs of each channel in a successive fashion by using a list that contains at least one entry for each channel. The DMA engine repeatedly cycles through the entries in the list to evaluate the data or memory requirements of each channel. In addition, the order in which the channels are evaluated can be programmed such that high bandwidth devices are serviced more frequently, while low bandwidth devices are serviced within a programmable time period. Thus, data requests to or from memory are for larger blocks of data that can withstand some latency.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to systems and methods for servicing and managing the data requests and memory requirements of devices operating within a computer system. A Direct Memory Access (DMA) engine acts as an intermediary between the memory system and the devices by consolidating the buffer requirements of the devices, providing scalable bandwidth and latency to both the devices and the memory system, minimizing the buffering requirements of the devices through guaranteed scheduling, and efficiently using idle time periods.

An overall feature of the DMA engine is the ability to support the data requirements of the devices in a particular system while ensuring sufficient response time and bandwidth for each device. The DMA engine includes a centralized data reservoir or buffer that replaces the buffers of the individual devices. In addition to reducing or eliminating the need for buffers in the various devices, the consolidated data reservoir of the DMA engine also provides centralized addressing. Also, by centralizing the buffer requirements into the data reservoir, the DMA engine is able to implement the DMA control logic a single time, whereas each device previously required separate DMA control logic.

Another feature of the DMA engine is related to the latency that devices often experience when interacting with memory. The DMA engine ensures that a request from a particular device for data will be handled within a predetermined time period in part by maintaining the data reservoir that holds each device's data. The data reservoir is maintained on a per channel basis by evaluating factors such as the bandwidth requirements of each channel associated with each device, the anticipated response time of the memory system to service the request of each channel, how long the viable data remaining in the data reservoir will last for each channel, and the like. This information is used to determine whether the channel being evaluated should be serviced immediately or whether the channel can wait until it is evaluated again before it is serviced. In this manner, the DMA engine ensures that each device or channel will have sufficient data stored in the data reservoir.

The DMA engine further ensures that the data requirements of all devices will be met within a certain time period by providing an interface to the DMA engine for both the devices and the memory. The DMA engine interface with the memory is adapted to the characteristics of a high performance memory system, while the DMA engine interface with the devices is adapted to the requirements of the devices. The DMA engine is therefore capable of accessing relatively large blocks of data from the memory while providing relatively smaller blocks of data to the devices from the data reservoir. Effectively, the DMA engine permits high priority devices, which may have low bandwidth requirements, to efficiently coexist with high bandwidth devices that may have lower priority.

The present invention extends to both methods and systems for servicing the memory requirements of multiple devices. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. One example of a special purpose computer is a set top box. Exemplary set top boxes include, but are not limited to, analog and digital devices such as satellite receivers, digital recording devices, cable boxes, video game consoles, Internet access boxes, and the like or any combination thereof By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
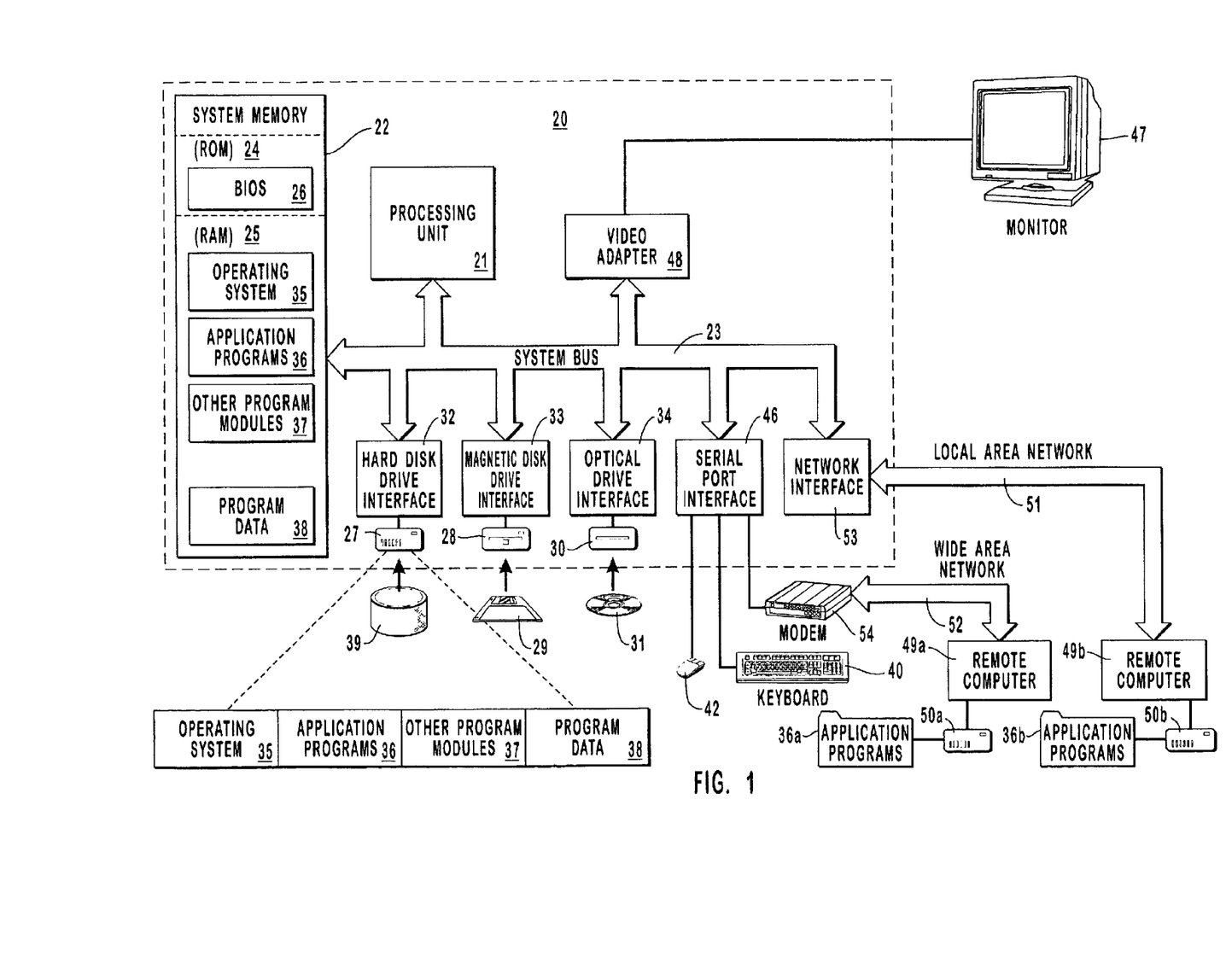
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet The modem 54, which may be internal or external, is connected to the system bus via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

As used herein, "data request" refers to either a read or a write operation. Data request can also apply to the interaction between the DMA engine and the system devices or to the interaction between the DMA engine and the main memory of the system. The present invention is primarily discussed in terms of memory reads, but it is understood to apply to memory writes as well. The memory or data requirements of a particular device can be evaluated from the perspective of either the DMA engine or the main memory of a system.

Figure 2:
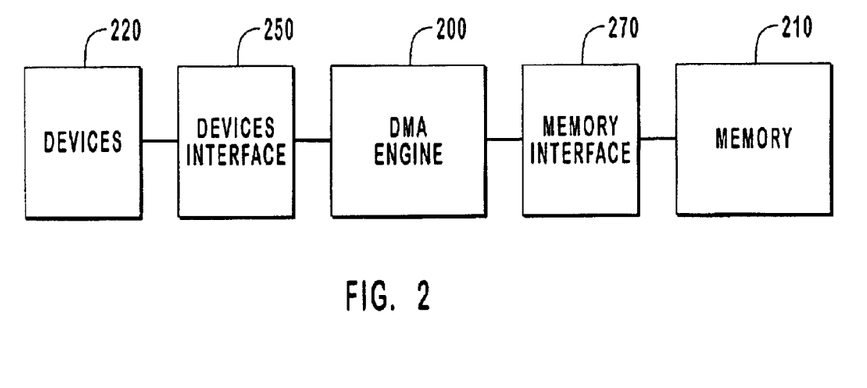
FIG. 2 is a block diagram illustrating a DMA engine that services the data and memory requirements of system devices.

FIG. 2 is a block diagram that illustrates a DMA engine for servicing and managing the memory or data requirements of system devices. Each device can be a hardware device or a software module or a combination thereof. The devices 220 interface with the DMA engine 200 through a devices interface 250. The devices interface 250 allows the DMA engine 200 to service the data requirements of the devices 220 while providing sufficient response time and bandwidth for the devices 220. The devices interface 250 further provides arbitration functionality to the devices 220 such that the DMA engine 200 services the data requests of eligible devices included in the devices 220 in any given cycle. In other words, the devices interface 250 determines which devices are eligible to make a service request to the DMA engine 200 in a given cycle or window. In this context, the data requests refer to reading or writing data to the DMA engine 200.

As described, the devices interface 250 makes a determination as to eligibility on a per device basis and does not consider the channels that may be associated with each device. The memory interface 270, however, determines whether to make a data request to memory 210 on a per channel basis. The memory interface 270 determines whether a particular channel should be serviced and provides arbitration functionality between the DMA engine 200 and the memory 210. The memory channel evaluates each channel in a repetitive fashion. In this manner, each channel is effectively guaranteed to be serviced within a particular time period. In this context, a data request refers to the transfer of data from the main memory to the DMA engine or from the DMA engine to the main memory. Thus, when a device makes a data request, it does not imply that data is transferred to or from the main memory. Also, when a data request is serviced by the main memory, it does not imply that a device has received or transferred data to the DMA engine even though these actions can occur at the same time.

In one example, the memory interface 270 may be viewed as a state machine that produces an output for a given input. The output is whether the channel being evaluated should be serviced and the input includes factors that determine whether the channel is critical. Those factors include, but are not limited to, the amount of data currently available to the channel in the DMA engine, how long it takes the main memory to service the data request of the channel, how long before the channel is evaluated again, and the like. After one channel has been evaluated, the state machine advances to the next channel.

After a particular sequence of channels has been evaluated, the state machine begins the evaluation process again at the beginning of the sequence. It is possible for a sequence to include a single channel more than once. While the devices interface 250 and the memory interface 270 are illustrated as being separate from the DMA engine 200, it is understood that the devices interface 250 and the memory interface 270 may be integral modules of the DMA engine 200. In addition, the devices interface 250 and the memory interface may comprise both hardware and software components.

Figure 3:
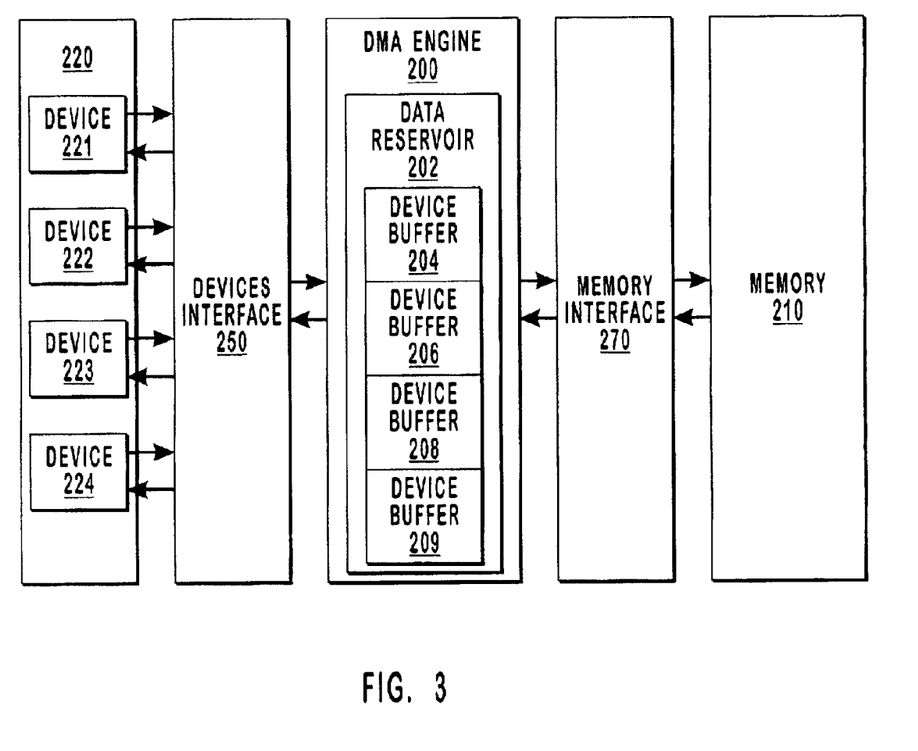
FIG. 3 is a more detailed block diagram of the DMA engine shown in FIG. 2.

FIG. 3 is a more detailed diagram illustrating the interaction between the devices 220, the memory 210 and the DMA engine 200. The exemplary system illustrated in FIG. 3 has devices 220 including device 221, device 222, device 223, and device 224. It is understood that the actual number of devices in a particular system is not limited to the illustrated devices but can vary depending on the configuration of the system. Each of the devices 221, 222, 223, and 224 has one or more channels over which data may be transferred. Exemplary devices include, but are not limited to audio devices, universal serial port (USB) devices, resampler devices, MPEG devices, and the like.

The DMA engine 200 includes a data reservoir 202 that includes device buffers 204, 206, 208, and 209. Each device buffer corresponds to a device included in the devices 220. More specifically, each channel of each device is allocated a portion of the data reservoir 202. In this manner, the buffer requirements of the devices 220 are consolidated into the data reservoir 202. More particularly, the data reservoir 202 replaces the small or medium sized buffers associated with the individual devices with a single large buffer. Not only does this arrangement conserve memory, but the DMA control logic that is usually implemented for each device may be instantiated a single time in the DMA engine 200.

In one example of the DMA engine 200, 56 independently configurable channels are available. In this example, there are 28 read channels and 28 write channels, and each device in the devices 220 may use more than one channel as previously stated. For example, an audio unit or device may use 4 read channels and 4 write channels. An MPEG unit or device may consume 5 channels consisting of 2 read channels, 1 control stream read channel, and 2 write data channels. A USB unit or device may use 1 read data channel and 1 write data channel. In other examples, the DMA engine 200 can support more or fewer channels. While FIG. 3 represents the data reservoir 202 as maintaining a device buffer for each device, the data reservoir 202 may actually maintain a portion of the data reservoir 202 for each channel of each device.

Whenever a device included in the devices 220 requires service for any of the channels of the device, a data request is sent to the DMA engine 200 through the device interface 250. The device interface 250, rather than performing arbitration on a per channel basis, arbitrates the data requests it receives on a per device or unit basis. If a device needs to make a data request for more than one channel, the device is responsible for making a data request for the higher priority channel because a device can usually only make a single request. From the perspective of the DMA engine 200, the bandwidth requirement of each device is determined by the device's channels, and the DMA engine 200 uses the latency of the urgent channel as the device latency when considering the device request.

The device interface 250 provides arbitration functionality that determines which devices or data requests are eligible to be serviced by the DMA engine 200. Once the eligible devices are identified, a basic arbitration scheme may be used to determine which data request should be granted. Determining which devices are eligible, however, includes scheduling the devices such that latencies can be effectively guaranteed. In addition, scheduling the devices in this manner prevents a particular device from consuming the available bandwidth until other devices have been serviced. Scheduling the devices will be discussed further with reference to FIG. 6.

In essence, the devices interface 250 provides a calculated latency and bandwidth tradeoff. A device having both a high priority and a low bandwidth may be able to withstand a larger latency than a device having a lower priority and a higher bandwidth. Proper scheduling ensures that high priority devices will have an adjustable, guaranteed response time while reducing the buffering requirements for the high bandwidth device. For example, audio devices are typically considered to be high priority devices and an MPEG device is a low priority device with high bandwidth. Because the MPEG device will be serviced in a programmable response time, the buffer requirement of the MPEG device is reduced even though other devices have to be serviced. A key aspect of the devices interface 250 is that each device is guaranteed of being serviced in a defined and programmable response time.

The devices are preferably managed by the DMA engine on a per device basis rather than a per channel basis because many of the devices may have low bandwidth and it is more efficient to consider the bandwidth of all the channels of a device. The memory interface 270, however, uses a list structure to manage the memory or data requirements of the individual channels. The entries in the list structure are channel identifiers that identify the channels of the devices 220.

The list, which is described in more detail with reference to FIG. 4, may be viewed as a circular list that is advanced to the next entry each time an entry or channel has been evaluated or serviced. Each channel represented by an entry in the list is evaluated for service on a regular basis, and each channel is assured of being serviced in a programmable response time. One reason the response time is programmable is because each channel can be included in the list structure more than once. This enables those channels that need more frequent servicing to be accommodated while still ensuring that the other channels will be evaluated or serviced within a known response time.

The DMA engine 200 uses the data reservoir 202 as a memory buffer for the devices 220. As the memory interface 270 rotates through the circular list maintained by the memory interface 270 and evaluates the channels represented by the entries in the circular list, the data remaining in the data reservoir 202 for each channel is evaluated. More specifically, the DMA engine 200 evaluates the portion of the data reservoir 202 that corresponds to the channel in the circular list of the memory interface 270 that is being examined.

The criteria for evaluating each portion of the data reservoir 202 include, but are not limited to, how many bytes are left in the portion of the data reservoir 202, a buffer time that corresponds to the rate at which the remaining data is being used by the device as well as how long those bytes will last, the latency of the memory system experienced while accessing the data from the memory 210, and an entry time representing when will the channel be evaluated again. These factors determine whether the channel being examined is critical or requires service. If the channel requires service a data request is made to the main memory. If the channel is not critical, then the channel can wait until it is evaluated again by the memory interface of the DMA engine. One benefit of examining each channel independently of the other channels is that the data can be managed in memory rather than in registers, which results in improved performance.

Figure 4:
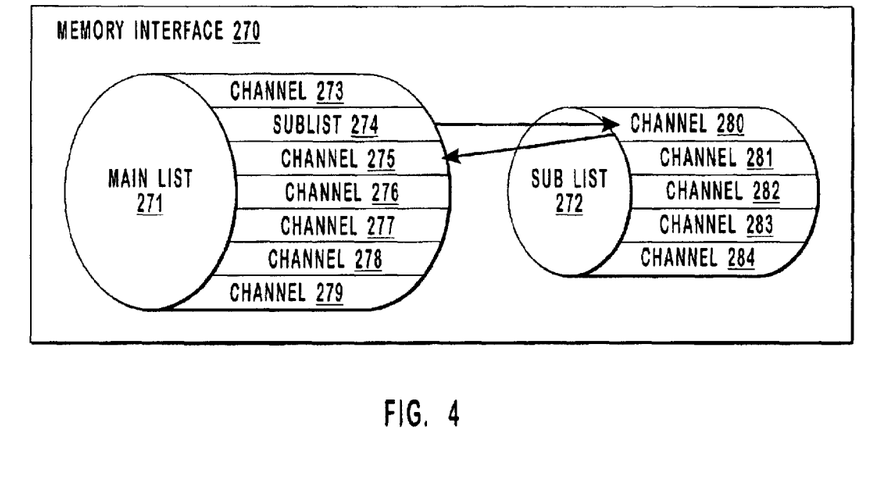
FIG. 4 is a block diagram illustrating the memory interface that provides arbitration functionality between the DMA engine and a system's memory.

FIG. 4 is a block diagram that represents the arbitration functionality between the DMA engine and the memory that is provided by the memory interface 270, which is included in the DMA engine 200. FIG. 4 illustrates the memory interface 270, which includes in this example, a main list 271 and a sub list 272. Each entry in the main list 271 corresponds to a channel. In a previous example, the DMA engine supported 56 channels, which are represented in the main list as entries or channel identifiers having the values of 0 to 55. The channel identifiers are represented as channels 273, 275, 276, 277, 278, and 279. It is understood that the length of the main list 271 can vary and only a few entries are illustrated in FIG. 4. Each channel identifier can be listed multiple times on the main list 271, but it is preferable that multiple entries for a single channel be evenly spaced on the main list 271. This allows a wide range of programed response times to be implemented without requiring significant storage or memory. Also, this ensures that the entry time or the time until the channel is to be evaluated again is known.

The main list 271 also supports identifier numbers higher than the number of channels supported by the DMA engine. In this example, 8 additional channel identifiers are supported and are represented by the numbers 56 through 63. Seven of these channel identifiers indicate a jump or a call from the main list 271 to a sub list such as the sub list 272. The sub-list call 274 is an example of these identifiers and sub-list call 274 points to the sub list 272. The sub list 272 contains channel entries similar to the entries on the main list 271, and each time a call to the sub-list is made, one entry in the sub-list is evaluated. After one entry on the sub-list has been serviced, the next entry in the main list 271 is evaluated and serviced as indicated by arrow 290. The next time a call to the sub-list is made from the main list 271, the successive entry in the sub list 272 is performed.

Figure 5:
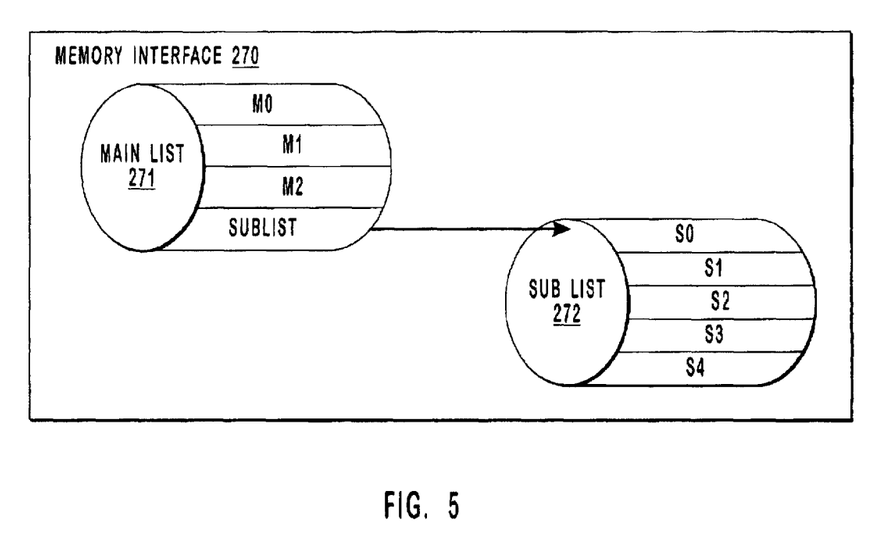
FIG. 5 is a block diagram illustrating a main list and a sub list and is used to show calls to channels on the main list as well as the sub list.

This provides the significant advantage of using smaller tables to replace a single larger table. In FIG. 5, for example, if a main list 271 had channels M0, M1 and M2 and the sub-list 272 had channels S0, S1, S2, S3, and S4, then the calling order of the entries in both lists would be M0, M1, M2, S0, M0, M1, M2, S1, M0, M1, M2, S2, M0, M1, M2, S3, M0, M1, M2, and S4. If a single list were used to implement this example, 20 entries would be needed in the list. By using a main list and a sub-list, however, only nine entries are needed in this example: a four entry main list and a five entry sub-list.

As illustrated in the previous example, only one entry on the sub-list is evaluated on the sub-list each time a call is made to that sub-list. Thus, another significant advantage of the sub list 272 is that the sub list 272 may be used to hold channels that can withstand longer latencies. Another advantage of the sub list 272 is that the main list 271 may be significantly shorter when sub lists are employed. Otherwise, the main list 271 would have to contain space for the entries on the sub list each time a jump to the sub list occurs. Thus, the use of sub lists conserves memory.

With reference to both FIGS. 3 and 4, assume that channel 273 is an identifier for one of the channels of the device 221. Also assume that the DMA engine 200 maintains the device buffer 204 for the channel 273. When the main list 271 reaches the channel 273, the channel 273 is evaluated to determine whether a data request should be made to memory 210. In the evaluation, the channel 273 is first checked to determine basic information such as whether the channel is enabled and which way the data is flowing, either to or from the memory 210. Next, full configuration data of the channel 273 is accessed from a memory channel control to determine the bandwidth requirement, the time until the channel 273 will next have an opportunity for service, the data format, the access style, and the like.

Next, the available data for the channel in the device buffer 204 is determined by accessing, for example, memory pointers. The amount of available data, in conjunction with how fast the available data is being used, determines how much time is represented by the available data. This value is compared against the response time, which includes how long until the channel will next be examined, as well as an allowance for system overhead. If the comparison indicates that the time remaining to the channel 273 is less than the response time, then the channel 273 is considered critical and a data request for service is posted by the DMA engine 200. If the channel 273 is critical, the data request is placed in a critical request queue for servicing. If the channel 273 is not critical, the data request may be placed in a non-critical request queue.

The critical requests, which are stored in the critical request queue, are then processed or serviced. The critical request queue is preferably a first in first out (FIFO) queue that may be reordered on occasion. In one example, the first four data requests in the queue are examined and serviced in an optimal order. The critical queue stores, in this example, the channel identifier; and control information including, but not limited to, current memory page address, first memory sub-page address, current memory length, transaction size, data format, data access style, and the like.

The non-critical request queue is not essential to the operation of the invention, but is used to hold the most pressing non-critical data requests. This queue is able to improve memory efficiency by making use of available cycles. For example, if the critical request queue is empty, then data requests in the non-critical queue may be serviced. Data requests in the non-critical queue may remain indefinitely if there is a large volume of other system traffic. If a request in the non-critical queue becomes critical, it is moved to the critical queue for servicing.

When determining the response time for a particular channel, it is often necessary to compute the worst case scenario for that channel. This is often dependent on several factors, including, but not limited to the response time of the memory system, the transaction size and the like. In order to determine whether a particular channel should be serviced involves an analysis of several factors, including but not limited to, the time until the channel will be checked again, the number of requests in the critical queue before a request is posted, the worst case latency from when a requests is posted until it is granted by the memory; and the worst case latency from when a request is granted until its servicing is complete. Some of these factors are design constants while others are dependent on the channel.

Because the main list 271 is embodied as a circular list, and because the worst case situations are considered, it is possible to guarantee that a particular channel will be serviced within a certain time period or frame. The advantage of this system is that the data requests to memory from the DMA engine are more suited to the characteristics of the high performance memory. Thus, the DMA engine preferably makes larges requests, accommodates large bandwidth, and is capable of experiencing significant latency without having an impact on the devices.

Figure 6:
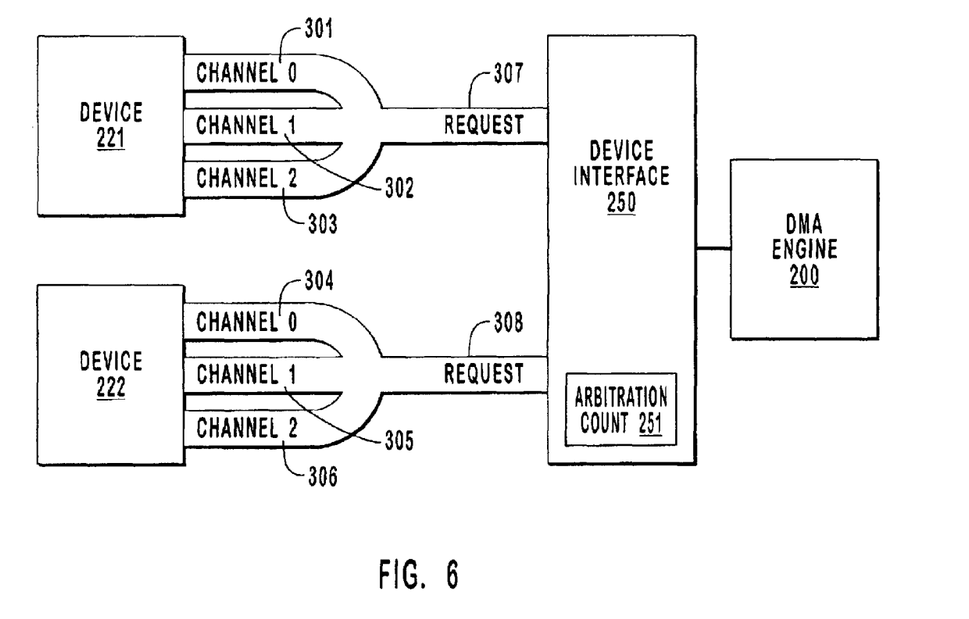
FIG. 6 is a block diagram illustrating the devices interface that provides arbitration functionality between the DMA engine and the system devices.

FIG. 6 illustrates the arbitration functionality provided by the device interface 250. FIG. 6 illustrates device 221, which has channels 301, 302, and 303, and device 222, which has channels 304, 305, and 306. In this example, the DMA engine 200 requires that the device 221 send a data request 307 whenever any one of the channels 301, 302, or 303 of the device 221 needs servicing. Similarly, the device 222 sends a data request 308 whenever one or more of the channels 304, 305 or 306 requires servicing. Because a request can represent one of several channels, the arbitration performed by the devices interface 250 is per device rather than per channel. Each device therefore has the responsibility of indicating which channel is most urgent or critical, and the latency that the device can experience is determined from the urgent channel.

The device interface 250 has an arbitration mechanism that is used to determine which devices are eligible to make requests to the DMA engine 200. In other words, a data request can only be made to the DMA engine when a device is eligible to make a request. In this example, the arbitration mechanism includes an arbitration count 251 that is represented by four bits, but other representations are equally valid. Eligible devices are determined, for example, by the following comparison logic: ((arbitration count XOR devVal) & devMask), where devVal is the device value and devMask is a defined value.

Whenever this logic comparison is true for a particular device, that device is eligible to make a data request for data from the data reservoir of the DMA engine. Using this comparison logic, the eligibility of a particular device can be programmed. More specifically, a particular device can be eligible to make a request every cycle, every other cycle, every fourth cycle, every eighth cycle or every sixteenth cycle. This logic also allows the eligibility of the devices to be staggered or scheduled such that any one device does not consume the available bandwidth. As used herein, "cycle" can refer to a defined time window, a certain number of clock cycles, or any other period in which data requests from eligible devices can be made or serviced.

For example, the device 221 may only be eligible every time the two least significant bits of the arbitration count 251 are zero. In this situation, the device 221 would be an eligible device for only one out of four cycles or arbitration counts. In a similar situation, the device 222 may only be eligible to make a data request every time the two least significant bits of the arbitration count 251 are both ones. In this situation, the device 222 is only eligible for one out of every four cycles. Even though the device 221 and the device 222 are only eligible for one out of every four cycles, they are eligible to make a data request on different cycles. In this manner, the requests of the devices can be scheduled in an efficient manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system having a direct memory access (DMA) engine with data reservoir storing channel data for one or more channels associated with one or more devices, a method for arbitrating data requests of the one or more channels to a main memory, the method comprising the acts of:

defining a circular list having a plurality of entries, wherein the entries correspond to the one or more channels;

evaluating a channel associated with an entry in the circular list to determine whether the channel requires service by performing acts comprising:

determining an entry time representing how long until the channel will be evaluated again, based at least on how many entries are in the circular list and how much time is needed to service the one or more channels corresponding to the entries in the circular list;

determining a latency representing how long the main memory will take to respond to a data request;

determining a buffer time representing how long data stored in the data reservoir maintained by the DMA engine will last for the channel; and determining that the channel requires service if the buffer time is less than the entry time and the latency; and servicing the channel by requesting channel data from the main memory to replenish the data reservoir if the channel requires service.

2. A method as defined in claim 1, wherein at least one of the plurality of entries is a call to a sub list having sub entries that correspond to the one or more channels, wherein one of the sub entries is serviced before returning to the circular list.

3. A method as defined in claim 2, further comprising the act of evaluating each sub entry as calls to the sub list are made from the circular list.

4. A method as defined in claim 1, further comprising the act of servicing each channel represented by the entries and the sub entries in a programmable response time.

5. A method as defined in claim 1, wherein the act of servicing further comprises the act of transferring data from the main memory to the data reservoir.

6. A computer-readable medium having computer-executable instructions for performing the acts recited in claim 1.

7. In a system having a main memory storing data for one or more devices, a method for servicing memory requirements of the one or more devices, the method comprising the acts of:

generating a centralized data reservoir, by a direct memory access (DMA) engine that is external to and shared by the one or more devices, for consolidating one or more otherwise separate memory buffers within the one or more devices in order to reduce device buffer requirements, the data reservoir maintaining a buffer for each of the one or more devices and the DMA engine implementing DMA control logic so that DMA control logic need not be duplicated in each of the one or more devices, wherein the DMA engine communicates with the main memory and the one or more devices communicate with the DMA engine;

determining, by the DMA engine, whether a data request should be made to the main memory for each of the one or more devices;

for each of the one or more devices requiring service for the data request, requesting from the main memory, by the DMA engine, additional data to replenish each buffer in the data reservoir for each of the one or more devices; and providing each of the one or more devices with access to each respective buffer in the data reservoir.

8. A method as defined in claim 7, wherein the act of generating a data reservoir further comprises the act of maintaining a channel buffer for each channel associated with each of the one or more devices.

9. A method as defined in claim 7, wherein the act of determining further comprises the acts of:

evaluating an entry in a list, the entry corresponding to a channel of a device, to determine if the channel is critical based on the factors of:

a buffer time representing how long until the channel buffer in the data reservoir is empty;

an entry time representing how long until the channel corresponding to the entry will be evaluated again; and a latency representing a main memory response time;

making the data request for the channel if the channel is critical; and refraining from making the data request for the channel if the channel is not critical.

10. A method as defined in claim 9, further comprising the act of evaluating a next entry in the list, wherein the next entry corresponds to another channel.

11. A method as defined in claim 9, wherein the act of making the data request further comprises the act of placing the data request in a critical queue.

12. A method as defined in claim 9, wherein the act of refraining from making the data request further comprises the act of placing the data request in a non-critical queue.

13. A method as defined in claim 7, wherein the act of providing each of the one or more devices with access further comprises the acts of:

maintaining an arbitration count;

determining which of the one or more devices are eligible to make a request for data to the DMA engine using the arbitration count; and increasing the arbitration count after all eligible devices have had the opportunity to make the request for data to the DMA engine.

14. A method as defined in claim 7, further comprising the act of servicing each of the one or more devices in a programmable time period.

15. A method as defined in claim 7, further comprising the act of replenishing each buffer in the data reservoir within a programmable time period.

16. A computer-readable medium having computer-executable instructions for performing the acts recited in claim 7.

17. In a computer system having a main memory storing data for one or more devices operating within the computer system, a method for making a data request to the main memory on behalf of one or more devices, the method comprising the acts of:

generating a main list, wherein the main list has at least one entry and each at least one entry comprises a particular channel of the one or more devices;

for each at least one entry, determining if an associated channel is critical by evaluating:

a buffer time representing how long a channel buffer associated with the associated channel will last;

an entry time representing how long until the associated channel will be evaluated again; and a latency representing a main memory response time, wherein the associated channel is critical if the buffer time is less than the entry time and the latency;

placing the data request in a critical queue if the associated channel is critical; and placing the data request in a non-critical queue if the associated channel is not critical.

18. A method as defined in claim 17, wherein the associated channel corresponds to more than one entry on the main list.

19. A method as defined in claim 17, wherein one of the at least one entries comprises a call to a sub list, the sub list returning to the main list after a single entry on the sub list has been serviced.

20. A method as defined in claim 17, wherein the act of determining if an associated channel is critical further comprises the act of repeatedly evaluating each entry in the main list.

21. A method as defined in claim 17, further comprising the act of transferring data from the main memory to a data reservoir maintained by a direct memory access (DMA) engine.

22. A method as defined in claim 17, further comprising the act of transferring data from a data reservoir maintained by a DMA engine to the main memory.

23. A method as defined in claim 17, further comprising the act of servicing the data request in the critical queue.

24. A method as defined in claim 17, further comprising the act of evaluating each at least one entry in a programmable response time.

25. A computer-readable medium having computer-executable instructions for performing the acts recited in claim 17.

26. In a computer system including one or more devices and a main memory storing data for the one or more devices, a system for servicing data requests of the one or more devices, the system comprising:

- a direct memory access (DMA) engine that is external to and shared by the one or more devices, the DMA engine (i) having a centralized data reservoir for consolidating memory buffers of the one or more devices in order to reduce device buffer requirements, and (ii) implementing DMA control logic so that DMA control logic need not be duplicated in each of the one or more devices;
- a devices interface operably connected with the DMA engine, wherein the devices interface arbitrates device data requests generated by the one or more devices for data from the data reservoir; and
- a memory interface operably connected with the DMA engine, wherein the memory interface arbitrates reservoir data requests generated by the DMA module for data from the main memory to replenish the data reservoir.

27. A system as defined in claim 26, wherein the data reservoir further comprises a plurality of device buffers, the plurality of device buffers storing data for the one or more devices, wherein each of the plurality of device buffers is associated with one of the one or more devices.

28. A system as defined in claim 27, wherein each of the plurality of device buffers further comprises at least one channel buffer for each channel associated with each of the one or more devices.

29. A system as defined in claim 26, wherein the devices interface further comprises an arbitration mechanism used to select eligible devices from the one or more devices, wherein the eligible devices make the device data requests.

30. A system as defined in claim 26, wherein the DMA engine guarantees that the device data requests of the one or more devices is serviced within a programmable response time.

31. A system as defined in claim 26, wherein the memory interface further comprises a circular list having a plurality of entries, each entry representing one of the channels of the one or more devices, wherein the channels are evaluated to determine if the channels are critical.

32. A system as defined in claim 31, wherein the circular list is linked to one or more sub lists, the one or more sub lists having additional entries.

33. A system as defined in claim 31, wherein the DMA engine makes the reservoir data request for the channels that are critical.

* * * * *

UNITED STATES PATENT AND TRADEMARK OFFICE
CERTIFICATE OF CORRECTION

PATENT NO. : 6,816,923 B1
DATED : November 9, 2004
INVENTOR(S) : Donald Gray It is certified that error appears in the above-identified patent and that said Letters Patent is hereby corrected as shown below:

Column 6,
Line 56, after "system bus" insert -- 23 --.

Signed and Sealed this

Tenth Day of May, 2005

JON W. DUDAS
*Director of the United States Patent and Trademark Office*